United States Patent

[11] 3,617,756

| [72] | Inventor | Erwin Sick<br>Stifterweg 6, Icking (Isartal), Germany |
|---|---|---|
| [21] | Appl. No. | 809,598 |
| [22] | Filed | Mar. 24, 1969 |
| [45] | Patented | Nov. 2, 1971 |
| [32] | Priority | Mar. 26, 1968 |
| [33] | | Germany |
| [31] | | P 17 72 064.8 |

[54] OPTICAL MEASURING APPARATUS USING MEASURING AND COMPARISON LIGHT BEAMS
7 Claims, 6 Drawing Figs.

[52] U.S. Cl............................................. 250/218,
250/229, 340/237, 356/205, 356/207
[51] Int. Cl......................................... G01n 21/12
[50] Field of Search............................................. 340/237;
250/204, 218, 229; 356/94, 201, 205, 207, 208

[56] References Cited
UNITED STATES PATENTS
| 2,547,212 | 4/1951 | Jamison et al. ............... | 250/218 X |
| 2,843,008 | 7/1958 | Moutet........................ | 250/218 X |
| 2,873,644 | 2/1959 | Kremen et al. ............... | 250/218 X |
| 2,877,453 | 3/1959 | Mendenhall.................. | 340/237 |

*Primary Examiner*—Roy Lake
*Assistant Examiner*—E. R. LaRoche
*Attorney*—Darbo, Robertson & Vandenburgh ABSTRACT: An optical measuring apparatus has optical elements which define two light paths from the filament of a light source to a photoelectric cell. Both of these paths traverse a rotating chopping disc. The beam along one path forms a comparison beam and the beam along the other path serves as a measuring beam. The optical elements of the measuring beam include a reflector so that the measuring beam has a portion of its path coincident in front of the reflector. An aperture diaphragm is positioned across a portion of the path of the measuring beam and the optical elements of the measuring beam are such as to image the aperture diaphragm in the plane of the reflector and in a size larger than the size of the reflector.

PATENTED NOV 2 1971

ERWIN SICK
INVENTOR.

BY
Darby, Robertson &
Vandenburgh

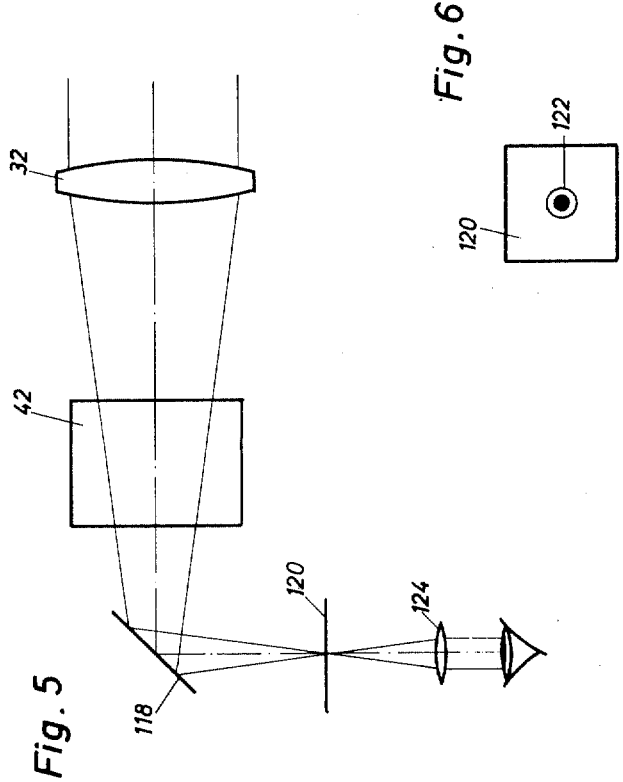

OPTICAL MEASURING APPARATUS USING MEASURING AND COMPARISON LIGHT BEAMS

The invention relates to optical measuring apparatus in which a cone of rays is transmitted to a photoelectric receiver via a reflector whose dimensions are smaller than those of the cross section of the cone of rays.

Apparatus of the kind heretofore described is disclosed by the German Laid-open Specification No. 1,227,688, which describes smoke density measuring apparatus in which two cones of rays are emitted from a light source to travel in opposite directions. The said cones of rays are deflected through 90° by means of deflecting mirrors, so that said rays are parallel to each other and are focused by means of a lens in the plane of a diaphragm disc. The diaphragm disc (chopper) is provided with two concentric rows of apertures and its axis is disposed eccentrically relative to the cones of rays in such a manner that one cone of rays is periodically released and interrupted by one row of apertures while the other cone of rays is periodically released and interrupted by the other row of apertures. Said interruption takes place at different frequencies. The two cones of rays are aligned substantially in parallel by means of front lens elements and each strike a reversing reflector. The cones of rays returned by the reversing reflectors are deflected between the aperture disc and the front lens element by means of partially reflected mirrors to converge on common ray-receiving means. In the known apparatus, the lamp filament and its entire structure is projected in the reflector plane, practically at infinity. This is not detrimental if the cross section of the cone of rays is smaller than the dimensions of the reflector, because the reversing reflector will simply return the entire forward travelling cone of rays upon itself, an effect which would not be altered by a minor relative displacement of cone of rays and reflector. If the reflector is however smaller than the cross section of the cone of rays or is even small relative thereto, any relative displacement of the cone of rays and reflector may result in a substantial change of intensity of the reflector cone of rays. This will be determined by that part of the lamp filament image, produced by the cone of rays, which is covered by the reflector.

The object of the invention is therefore to construct optical measuring apparatus of the kind heretofore described in such a manner that any slight relative displacement of the cone of rays and reflector does not cause any change in the luminous flux which strikes the photoelectric receiver.

According to the invention, this is achieved in that an aperture diaphragm, which determines the aperture of the cone of rays directed on to the reflector, is imaged in the reflector plane.

If the aperture diaphragm is uniformly illuminated, the reflector plane will also be uniformly illuminated. The intensity of the part cone of rays, received and reflected by the reflector, will not vary if the reflector moves relative to the forward travelling cone of rays.

Embodiments of the invention will now be described by way of example with reference to the accompanying drawings in which:

FIG. 5 is a partial plan view of a modification of the arrangement shown in FIG. 1, FIG. 6 is a detail of the arrangement of FIG. 5.

Figure 1:
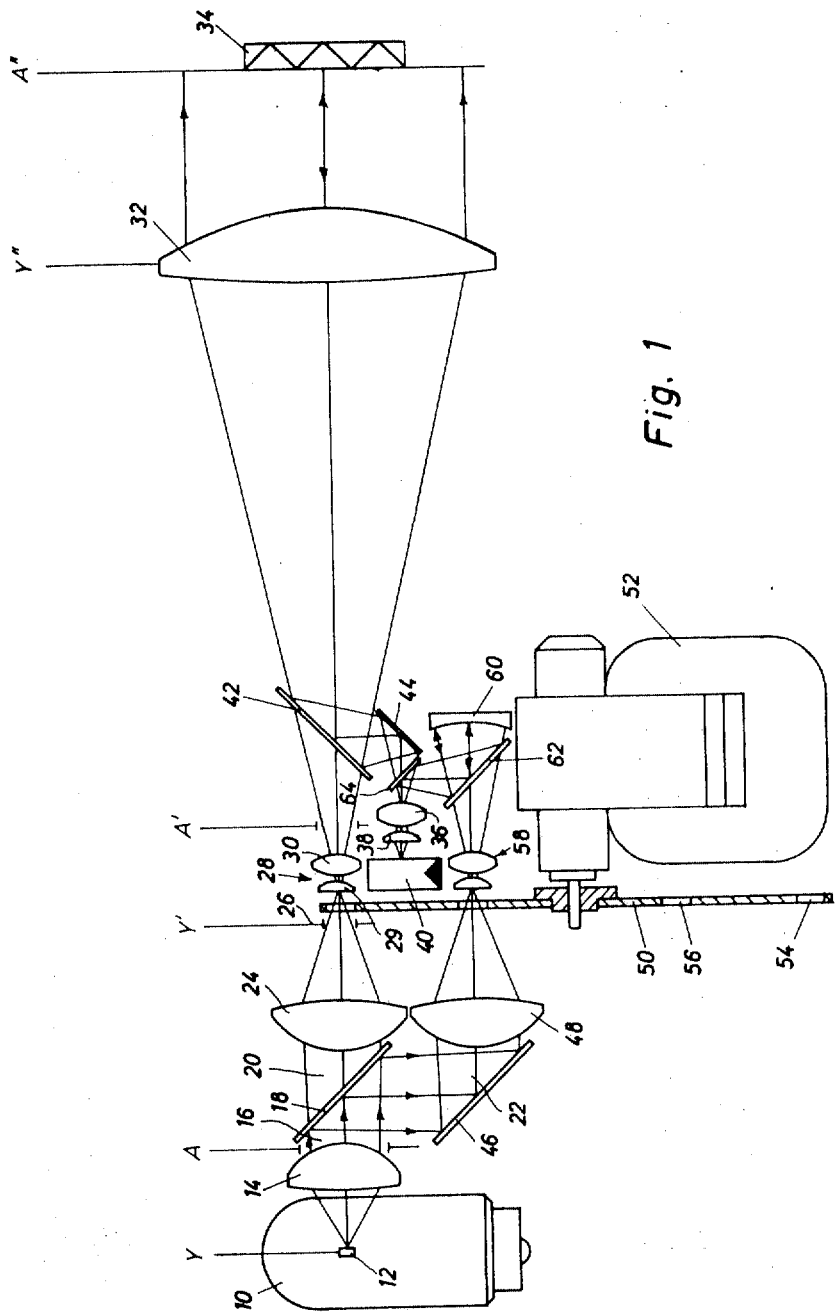
FIG. 1 is a diagrammatic side view of a first embodiment of the invention.

Referring to the drawings, the numeral 10 refers to a lamp, serving as light source and having a filament 12. A parallel beam of light 16 is produced by means of a first condenser lens 14 from the light emitted by the filament 12. The light beam 16 is bounded by an aperture diaphragm A. A partially transmissive mirror 18, inclined at an angle of 45° relative to the light beam axis, is disposed in the optical path behind the aperture diaphragm A. The partially transmissive mirror 18 divides the light beam 16 into a transmitted measuring light beam 20 and a reflected comparison light beam 22. A second condenser lens 24 is disposed in the optical path of the measuring light beam 20. The filament 12 (Y) is projected as (Y') by the optical condenser system formed by the lenses 14 and 24. A field stop 26 is disposed in the plane of the filament image (Y'). The field stop is operative only for the core of the filament, so that colder zones thereof are not utilized. The field stop 26 is therefore uniformly illuminated.

The filament image Y' is projected as Y'' on a front lens element by means of a micro-objective, comprising the lenses 29 and 30.

The aperture diaphragm A is projected in the plane A' by the condenser lens 24 and by the micro-objective 28. The plane A' is projected by the front lens element 32 as A'' in the plane of a reversing reflector 34 so that the dimensions of the aperture diaphragm image A'' are substantially greater than those of the reversing reflector 34.

The reverse projection of the reversing reflector 34 is provided by the lens 32 as well as by an optical system comprising the lenses 36 and 38, so that said reverse projection appears as A''' on a photo-element 40. The returning optical path passes via a reversing mirror 44 as well as via a partially transmissive mirror 42 which is inclined at an angle of 45° to the axis of the light beam.

The comparison light beam 22 is once again deflected through 90° by means of a deflecting mirror 46 so that it extends in parallel to the measuring light beam 20. A third condenser lens 48, disposed in the optical path of the comparison light beam produces an image of the filament in the same plane in which the filament image Y' is produced in the optical path of the measuring light beam.

A disc diaphragm 50, driven by a motor 52 and having two concentric rows of apertures, is disposed immediately behind the plane of the filament images. The optical path of the measuring light beam extends in the zone of one row of apertures while the optical path of the comparison light beam extends in the zone of the other row of apertures. The rows of apertures modulate the two light beams substantially in sinusoidal manner, the modulation being different for the two light beams to enable the corresponding receiver signals to be electrically separated behind the light detector 40.

The optical path of the comparison light beam is similar to that of the measuring light beam. Said path also contains a micro-objective 58 as well as a concave mirror 60 instead of the front lens element 32. An optical autocollimation path is obtained in conjunction with the concave mirror 60. The returning light beam is deflected by a partially transmissive mirror 62 which is inclined at an angle of 45° relative to the axis of the light beam, a further partially transmissive mirror 64, disposed in the line bisecting the angle between the two light beam axes, reflecting said comparison light beam coaxially between the lens 36 and the deflecting mirror 44 into the optical path of the measuring light beam. This procedure ensures that the measuring light beam and the comparison light beam strike the radiation receiver 40 in a geometrically identical manner. Any directionality of the receiver sensitivity will be of no consequence in this arrangement. The effect of any change of the spatial light distribution of the light source 10 is also eliminated in the arrangement heretofore described, since the measuring light beam and the comparison light beam are both radiated from the light source in precisely the same direction.

Figure 2:
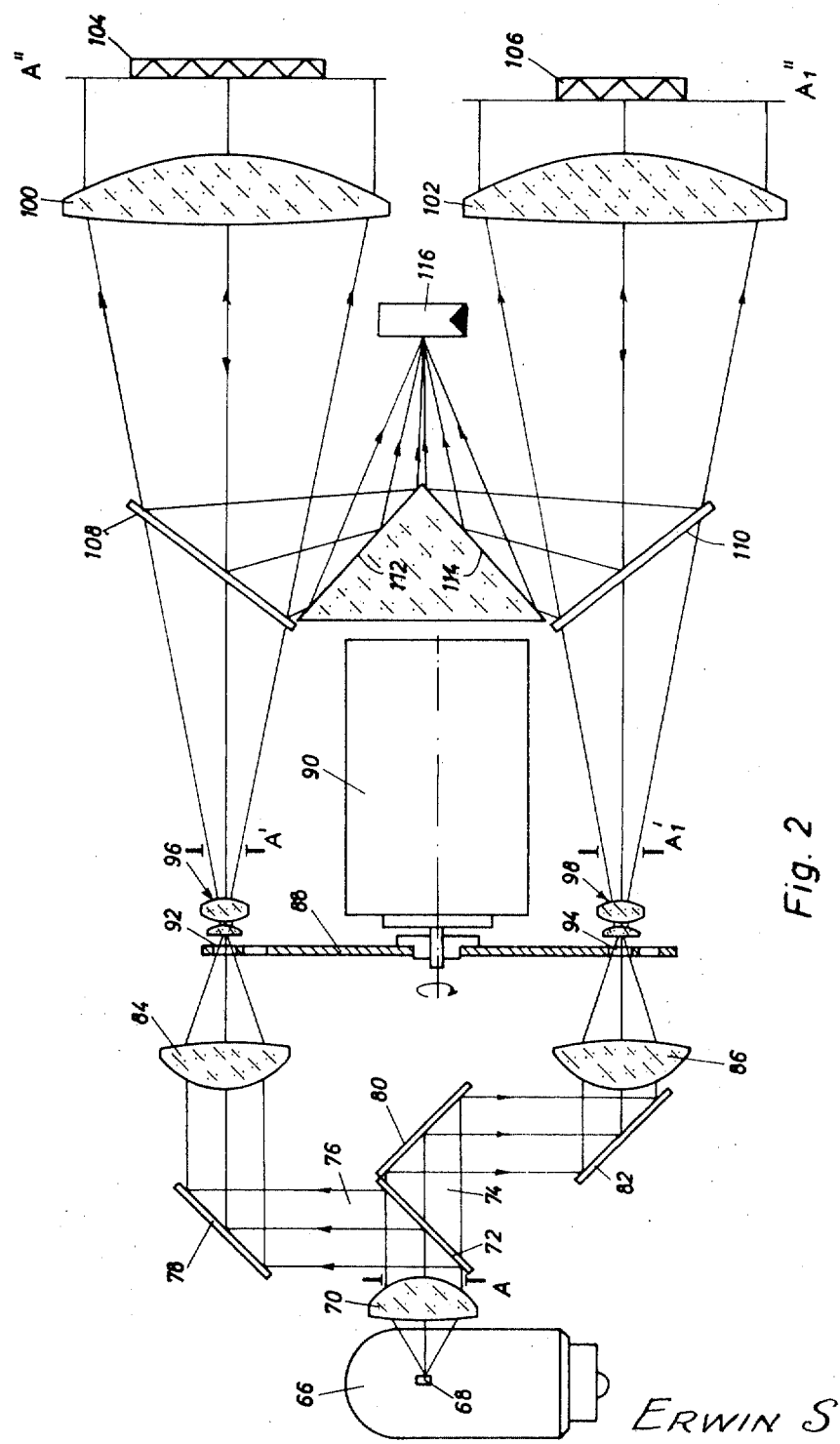
FIG. 2 is a diagrammatic plan view of a second embodiment of the invention.

In the embodiment illustrated in FIG. 2, a light source 66 with a filament 68 is provided. Light emitted by the filament 68 is transformed into a light beam and is aligned in parallel by means of a condenser lens 70. Said light beam strikes a partially transmissive mirror 72 which is inclined at an angle of 45° relative to the light beam axis. Two partial light beams will thus be produced, namely the transmitted light beam 74 and the reflected light beam 76. The reflected light beam 76 is deflected through 90° by means of a defecting mirror 78. The transmitted light beam 74 is deflected twice through 90° each by means of two deflecting mirrors 80 and 82 so that finally both light beams extend in parallel to each other. Condenser lenses 84 and 86 are disposed in the optical paths of the two light beams, said lenses being adapted to produce, in a manner similar to that of the arrangement illustrated in FIG. 1, images of the filament 68 in a position closely in front of a disc diaphragm 88, provided with two rows of apertures and driven by a motor 90. One row of apertures 92 extends through the optical path of the light beam 76 while the other row of apertures passes through the optical path of the light beam 74. The two light beams are thus modulated in different manner. The light source image is projected upon one front lens element 100 and 102 each by means of two micro-objectives 96 and 98 which are similar to the objectives 28 and 58 illustrated in FIG. 1. One aperture diaphragm may be imaged in the planes of one reversing reflector 104 or 106 each in the optical path of the two light beams in a manner similar to that illustrated in FIG. 1, the aperture diaphragm image being substantially larger than the dimensions of the reversing reflectors 104 or 106 respectively. The returning light beam is inwardly deflected by a partially transmissive mirror 108 or 110 respectively, which is inclined at an angle of 45° to the light beam axis to strike one side 112 and 114 respectively of a roof prism mirror which may for example be formed from the external sides of a roof prism. The two returning light beams are reflected by the aforementioned mirror sides 112 and 114 at the same angle and almost perpendicularly on to a radiation receiver 116.

Figure 3:
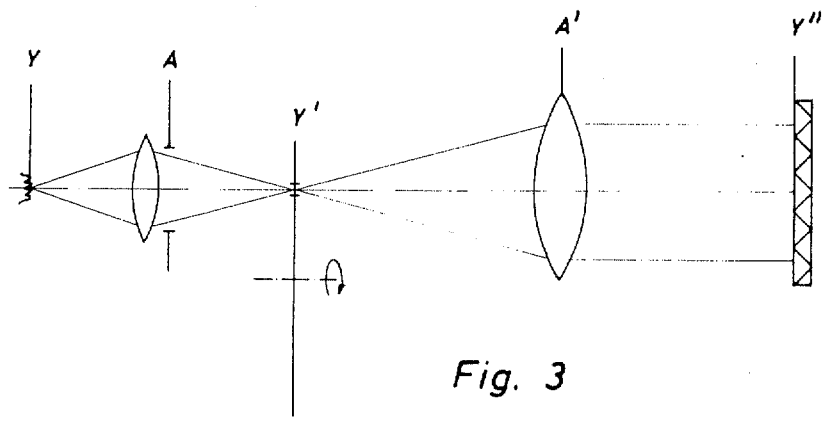
FIG. 3 shows an optical path according to the prior art.
Figure 4:
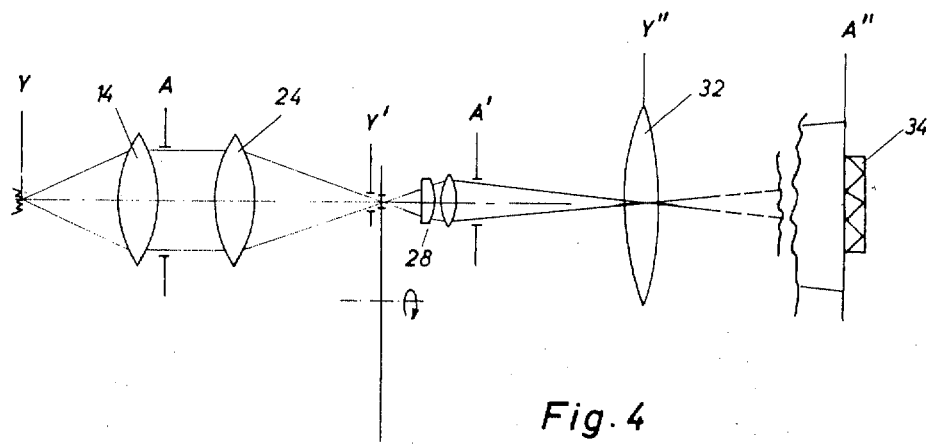
FIG. 4 shows for comparison purposes an optical path according to the invention.

The difference between the arrangement according to the invention as described hereinabove and the prior art may be understood most readily by a comparison of FIGS. 3 and 4, FIG. 3 showing an arrangement according to the prior art, for example, as disclosed by the German Laid-open Specification 1,227,688 while FIG. 4 shows an arrangement according to the invention.

In the arrangement according to the prior art and illustrated in FIG. 3 the lamp filament Y is projected in the plane of a disc diaphragm by means of a lens at Y'. The image Y' is disposed in the focal plane of the front lens element which produces a filament image Y'' at infinity, where the reflector is in practice positioned. The aperture diaphragm A is projected through the apertures of the disc on to the front lens element in the manner of a pinhole camera. It is a disadvantage of this system that the light beam shows the filament structure at infinity, that is to say, in the reflector plane. To be independent of the effects of position it is therefore necessary for the reflector to be larger than the cross section of the light beam.

In the arrangement according to the invention and illustrated in FIG. 4 the filament Y is projected by the lenses 14, 24 as Y' immediately in front of the disc diaphragm which is disposed at he focal point of the micro-objective. The micro-objective 28 projects Y' as Y'' on the front lens element while an aperture diaphragm A is projected by the lens 24 and the micro-objective 28 at A' and A' is projected by the front lens element 32 at A'', at infinity in the plane of the reflector 34.

An optical adjusting system, as shown in plan view in FIGS. 5 and 6, may be provided to facilitate alignment of the transmitter-receiver part of FIG. 1 relative to the reflector 34. A mirror 118, inclined at an angle relative to the optical path is disposed between the partially transmissive mirror 42 and the lens 30. The mirror 118 deflects the light beam in the forward direction in FIG. 1 to produce a reflector image in the plane of the screen 120. The screen 120 is provided with a reference mark 122 (FIG. 6) and is observed through a magnifier 124. The apparatus is aligned so that the reflector image, which is visible as an illuminated spot, is disposed concentrically relative to the reference mark.

What is claimed is:

1. In an optical measuring apparatus comprising a light source, a photoelectric receiver and optical means, including light reflector of a given size and an aperture diaphragm, for defining a measuring light beam in a path between the source and the receiver, said light beam traversing said diaphragm and, along a portion of said path, said light beam being directed toward and returned from said reflector along a common way, the improvement comprising:
said optical means imaging said aperture diaphragm in the plane of said reflector and in a size larger than the size of said reflector.

2. In an apparatus as set forth in claim 1, including rotating disc diaphragm means for chopping light beams, said light path traversing said disc diaphragm to be chopped thereby with the receiver on one side of the disc diaphragm means and the source on the other side thereof; and
wherein said optical means includes a partially transmissive mirror between said source and said disc diaphragm to divide from said beam a comparison beam, said optical means directing said comparison beam along a second path to the receiver, said two beams striking the receiver from at least approximately the same direction, said second path traversing said disc diaphragm means in a different area thereof so that the comparison beam is chopped differently than is said measuring beam.

3. In an apparatus as set forth in claim 2, wherein said optical means includes a second partially transmissive mirror means positioned on said one side of said disc diaphragm means, both of said path including said second mirror means, the arrangement being such that both beams strike the receiver along a common axis.

4. In an apparatus as set forth in claim 3, wherein said optical means includes an optical condenser system between said source and said disc diaphragm means, stop diaphragm means having an opening through which said measuring beam passes, said stop diaphragm means being positioned between said system and said disc diaphragm means, said opening being only sufficiently large to pass radiation from the uniformly illuminated central portions of said source, said aperture diaphragm being between said source and said stop diaphragm means.

5. In an apparatus as set forth in claim 4, wherein
said condenser system includes a pair of condenser lenses between which said measuring beam comprises parallel light rays, said aperture diaphragm being positioned between said lenses, said mirror between said source and said disc diaphragm means being between said diaphragm means and the one of said lenses which is closes to said disc diaphragm; and
said optical means includes a micro-objective positioned in the path of the measuring beam between said one lens and said reflector, and a front lens between said micro-objective and said reflector.

6. In an apparatus as set forth in claim 5, wherein
said disc diaphragm means has two rows of openings therethrough, said rows being at different radial distances from the axis of rotation thereof, said measuring beam being aligned with one row and said comparison beam being aligned with the other row,
along said comparison beam said optical means sequentially comprising, commencing with said partially transmissive mirror between said source and said disc, a deflecting mirror, a third condenser lens, a second micro-objective, a third partially transmissive mirror, a concave mirror and said second partially transmissive mirror, said second transmissive mirror being inclined at an angle that bisects the angle between the axis of the measuring beam and the axis of the comparison beam.

7. In an apparatus as set forth in claim 2, wherein
said partially transmissive mirror is inclined at an angle of 45° to the axis of the beam from the source thereby splitting said beam from the source into a reflected beam and a transmitted beam,
said optical means including a reflective mirror in the path of said reflected beam and two reflective mirrors in the path of said transmitted beam, said mirrors being so positioned at the two beams after leaving the last of said mirrors are parallel to each other and proceeding in the same general direction, said disc diaphragm means being positioned to intersect and chop said two parallel beams, said optical means on said one side of said disc diaphragm means including two additional partially transmissive mirrors and a roof prism, one of said additional mirrors being positioned in one of said parallel paths and inclined to deflect the beam in the one path generally toward the other path, the other of said additional mirrors being positioned in the other of said parallel paths and inclined to deflect the beam in the other path generally toward said one path, said roof prism being positioned to intercept the latter two deflected beams and direct both toward said receiver.

* * * * *